(12) United States Patent
Stefanelli

(10) Patent No.: US 8,429,855 B2
(45) Date of Patent: Apr. 30, 2013

(54) WINDOW WEATHERSEAL WITH MOLDED WEATHERSTRIP

(75) Inventor: Didier Stefanelli, Saint Christophe des Bois (FR)

(73) Assignee: Cooper-Standard Automative France S.A., Argenteuil (FR)

( * ) Notice: Subject to any disclaimer, the term of this patent is extended or adjusted under 35 U.S.C. 154(b) by 222 days.

(21) Appl. No.: 12/300,825

(22) PCT Filed: May 16, 2007

(86) PCT No.: PCT/FR2007/051295
§ 371 (c)(1),
(2), (4) Date: Jan. 2, 2009

(87) PCT Pub. No.: WO2007/135329
PCT Pub. Date: Nov. 29, 2007

(65) Prior Publication Data
US 2009/0265999 A1 Oct. 29, 2009

(30) Foreign Application Priority Data
May 18, 2006 (FR) ...................................... 06 51807

(51) Int. Cl.
*E06B 7/16* (2006.01)
(52) U.S. Cl.
USPC .............................................. 49/440; 49/441
(58) Field of Classification Search ................... 49/440, 49/441, 501
See application file for complete search history.

(56) References Cited

U.S. PATENT DOCUMENTS

| 4,704,820 | A  | * | 11/1987 | Kisanuki ......................... 49/441 |
| 4,894,954 | A  | * | 1/1990  | Nozaki et al. ................. 49/479.1 |
| 5,433,038 | A  |   | 7/1995  | Dupuy |
| 5,493,814 | A  | * | 2/1996  | Christian ...................... 49/479.1 |
| 6,612,074 | B1 | * | 9/2003  | Kaye et al. ...................... 49/441 |
| 6,668,488 | B2 | * | 12/2003 | Nozaki et al. ................... 49/441 |
| 6,681,526 | B2 | * | 1/2004  | Mueller et al. .................. 49/440 |
| 6,837,005 | B2 | * | 1/2005  | Arata et al. ..................... 49/440 |
| 2001/0015035 | A1 | * | 8/2001 | Nozaki ............................ 49/440 |

FOREIGN PATENT DOCUMENTS

| DE | 3843057     | 7/1989 |
| DE | 102004059384 | 7/2005 |
| EP | 0422592     | 4/1991 |
| EP | 0678412     | 10/1995 |
| EP | 0983891     | 3/2000 |
| FR | 2856331     | 12/2004 |

* cited by examiner

*Primary Examiner* — Katherine Mitchell
*Assistant Examiner* — Justin Rephann
(74) *Attorney, Agent, or Firm* — Novak Druce Connolly Bove + Quigg LLP

(57) ABSTRACT

The invention concerns the field of window seals to be encased in a frame, in general a motor vehicle door frame. The seal is intended to be in contact with part of the perimeter of a window and comprises a guide slot strip consisting of two upward segments and an upper segment, and a sealing strip extending between a low part of one of said upward segments and a high part of the other of said upward segments. The sealing strip is molded in a single piece and comprises an upward curved part, and is attached at least at its upper end to one of the upward segments of the guide slot strip.

22 Claims, 3 Drawing Sheets

WINDOW WEATHERSEAL WITH MOLDED WEATHERSTRIP

This application is a National Stage of PCT/FR2007/051295 filed May 16, 2007 which in turn claims priority from French Application 0651807 filed May 18, 2006, the entire contents of which are incorporated herein by reference.

The present invention concerns the field of window seals.

The invention concerns more particularly the field of window seals to be encased in a frame, intended to be in contact with part of the perimeter of a window, and comprising a guide slot strip consisting of two upward segments and an upper segment, and a sealing strip extending between a low part of one of said upward segments and a high part of the other of said upward segments.

In bodywork components comprising a sliding window, such as typically a motor vehicle door, the window slides in a substantially vertical direction. In its open position, the window is in a low position, completely or partially retracted into the thickness of the door between the outer and inner surfaces thereof; in changing from its open position to its closed position, the window comes out via the upper edge of the door. In its closed position, the window is in the high position and the lower part of its perimeter (lower edge, and lower portions of the front and rear edges) remains inserted in the thickness of the door, whilst the upper edge and the front and rear edges come respectively into contact with the upper, front and rear posts forming the door frame. In order to provide sealing between the door frame and the window when the latter is in the closed position, on the one hand a continuous seal (guide slot strip) is encased in these posts, and on the other hand the upper edge of the door is provided with a seal (sealing strip) which comes opposite the window. This sealing strip is provided with a slippery coating, for example a flocked lip. Flocking is a method that consists of depositing, on an element, hairs perpendicular thereto by an electrostatic means and fixing them with adhesive. These hairs rub on the window when the latter changes from an open to a closed position and vice versa, and have the aim of preventing water or other elements entering the thickness of the door between the outer and inner surfaces thereof. The guide slot and sealing strips and the slippery coating, for example the flocked lip, are typically made from elastomer, thermoplastic, or thermoplastic elastomer (TPE).

Figure 7:
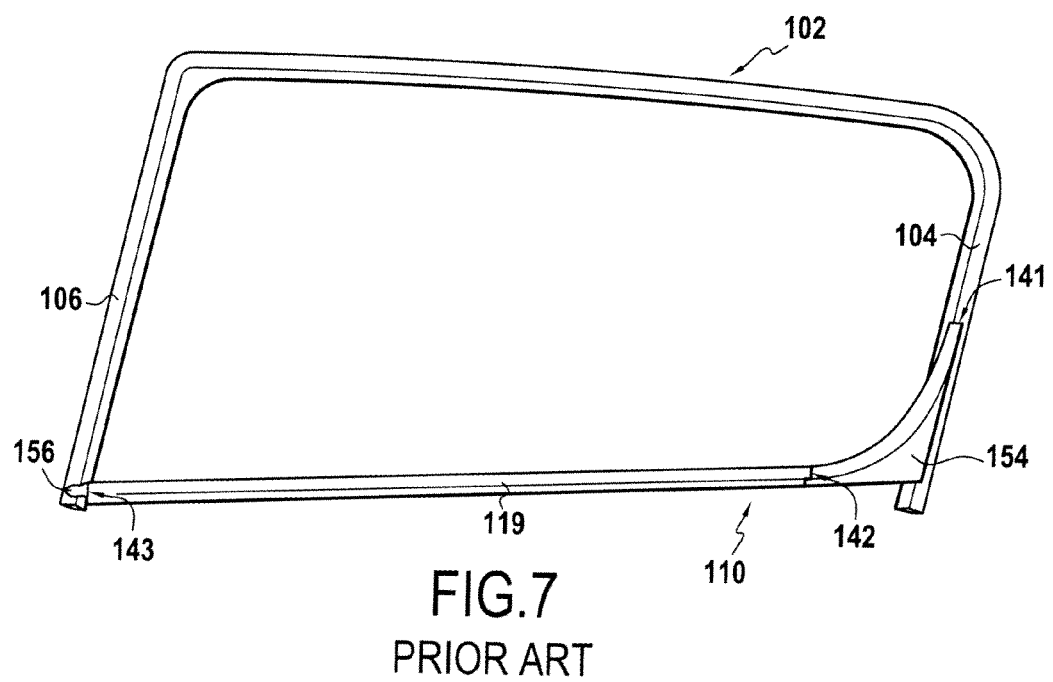

FIG. 7 depicts a seal according to the prior art. This seal comprises a guide slot strip 102 and a sealing strip 110. The guide slot strip is extruded, and the sealing strip consists of an extruded part 119, and a moulded connection 154. The guide slot strip 102 and the extruded part of the sealing strip 119 often comprise a metal framework. The extruded part of the sealing strip 119 is connected to the rear upward segment 104 of the guide slot strip by means of the moulded connection 154. This moulded connection is essential for making a sealed connection between the rear part of the sealing strip 110 and the rear upward segment 104 of the guide slot strip. It has, at the rear lower corner of the door frame, a curved shape whereof the function is aesthetic (style connection). As for the junction between the front part of the sealing strip 110 and the front upward segment 106 of the guide slot strip, this is implemented by means of a front moulded connection 156.

As the sealing strip 110 and the guide slot strip 102 are extruded, their junction with the moulded connection 154 necessarily causes the appearance of a first join line 141 between the moulded connection 154 and the rear upward segment 104 of the guide slot strip, and a second join line 142 between the sealing strip 110 and the moulded connection 154. The junction between the sealing strip 110 and the front moulded connection 156 causes the appearance of a third join line 143. These join lines have the appearance of a ridge and are visible, being all the more so the greater the change in shape of the cross-section between the sealing strip 110 and the rear upward segment of the guide slot strip 104. Their visibility is intensified by the difference in colour which always appears on ageing between an extruded component such as the sealing and guide slot strips, and a moulded component. These join lines are therefore aesthetically undesirable. Moreover, the inner area of the moulded connection 154 must be reworked with flocking or another slippery coating in order to provide resistance to abrasion between the door and the window. This rework must necessarily be done manually, and is therefore of lower quality, is not very practical, and generates additional costs. Furthermore, as the sealing and guide slot strips comprise a metal framework, their recycling is less easy and more expensive.

The present invention aims to remedy these drawbacks.

The invention aims to propose a new type of door window seal that makes it possible to reduce the number of join lines between the guide slot strip and the sealing strip, facilitate manufacturing of the seal, reduce manufacturing costs, and allow better recycling of the strips.

This aim is achieved by virtue of the fact that the sealing strip is moulded in a single piece and comprises an upward curved part, and the sealing strip is attached at least at its upper end to one of the upward segments of the guide slot strip.

For example, the junction between the sealing strip and one of the upward segments of the guide slot strip is situated close to the upper segment of the guide slot strip.

By virtue of these provisions, it is no longer necessary to use a moulded connection between the sealing strip and the upward segment (in general the rear segment) of the guide slot strip, since the sealing strip is moulded. There is therefore only a single join line between the sealing strip and the rear upward segment of the guide slot strip. Moreover, the other part of the sealing strip (in general its front part) is moulded so that it crosses the upward segment (in this case the front segment) of the guide slot strip, removing the necessity for a moulded connection between the front part of the sealing strip and the front upward segment of the guide slot strip. In total, there is therefore only a single join line between the guide slot strip and the sealing strip, instead of three join lines. Overall, the manufacture of the seal is facilitated and is less expensive, since it is no longer necessary to use a moulded connection.

Advantageously, the sealing strip is manufactured by bi-injection of a rigid material and a flexible material, defining in the sealing strip a rigid part and a flexible part which are distinct.

For example, the rigid part can be made from rigid plastic and the flexible part made from elastomer.

By virtue of these provisions, it is no longer necessary to strengthen the sealing strip with a metal framework. The manufacture of the sealing strip is therefore facilitated, and its recycling is facilitated and less expensive.

Advantageously, the rigid part of the sealing strip comprises means for holding on said frame.

The mounting of the seal on the frame is therefore facilitated, its efficiency improved, and its total manufacturing cost reduced.

Advantageously, at least part of the length of said sealing strip is provided with a slippery coating.

For example, this slippery coating is a flocked profile.

For example, the slippery coating or flocked profile is added on to the sealing strip, or is co-moulded on said sealing strip.

Thus, it is no longer necessary to perform any flocking rework of the inner area of the moulded connection, it being possible to keep a flocked profile over the entire length of the sealing strip.

Advantageously, the slippery coating is a lip.

Advantageously, a portion of the upward curved part replaces a part of said upward segment of the guide slot strip which has been removed.

This configuration makes it possible to obtain better continuity between the upward curved part of the sealing strip and the upward segment of the guide slot strip.

Figure 1:
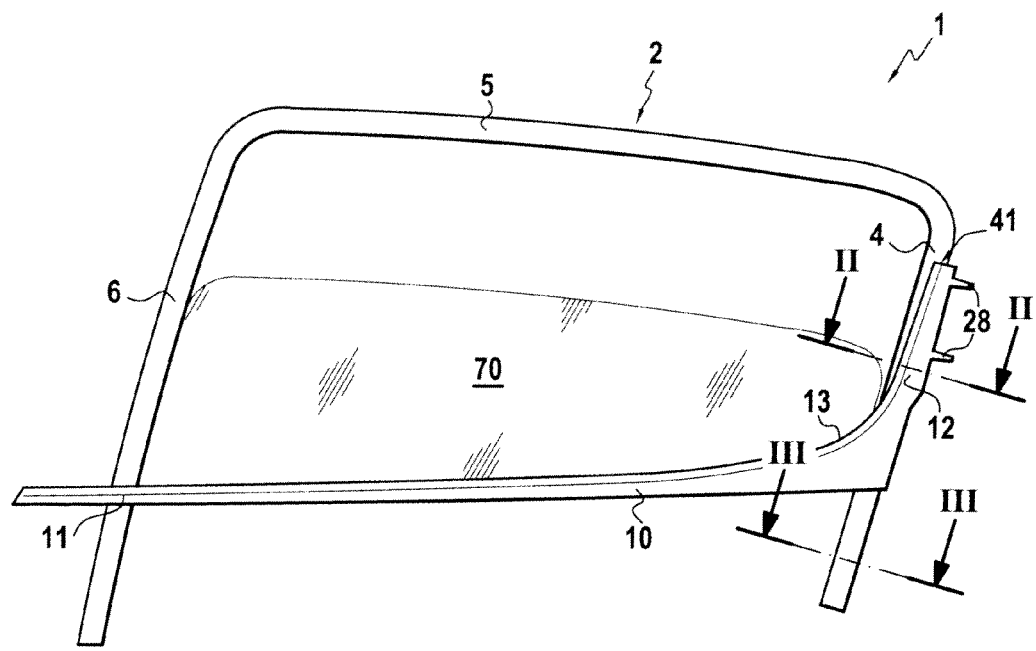
Figure 2:
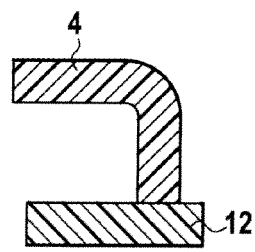
Figure 3:
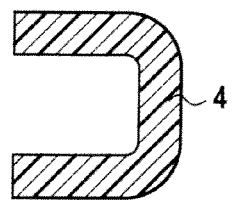
Figure 4:
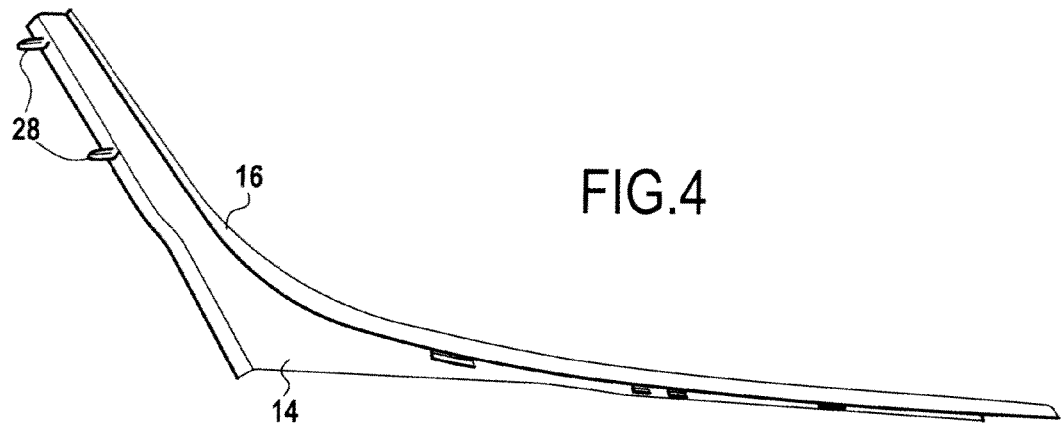
Figure 5:
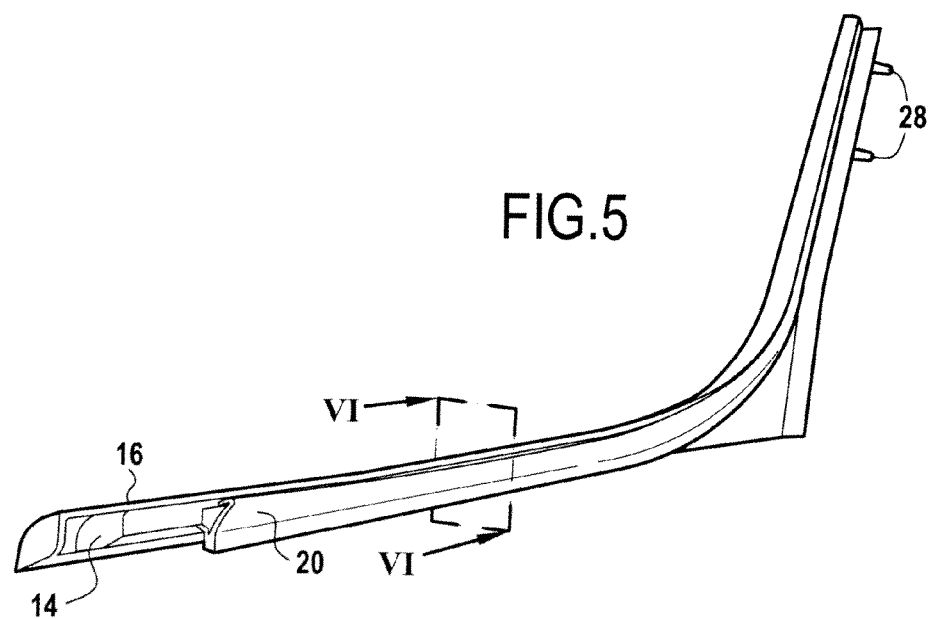
Figure 6:
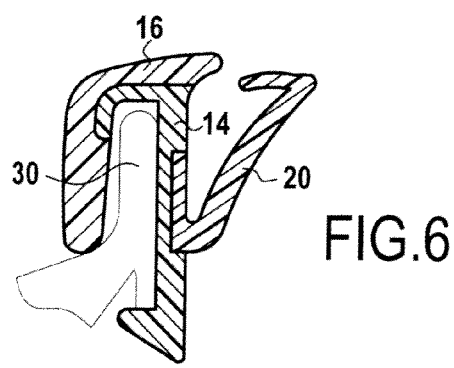

The invention will be better understood and its advantages will appear more clearly upon a reading of the following detailed description of an embodiment depicted by way of a non-limiting example. The description refers to the accompanying drawings in which:

FIG. 1 is a front view of the seal according to the invention;
FIG. 2 is a cross-section along the line II-II of FIG. 1;
FIG. 3 is a cross-section along the line III-III of FIG. 1;
FIG. 4 is a perspective view of the sealing strip according to the invention;
FIG. 5 is a perspective view of the sealing strip according to the invention having a flocked lip;
FIG. 6 is a cross-section along the line VI-VI of FIG. 5;
FIG. 7 is an embodiment of a seal according to the prior art.

As depicted in FIG. 1, the seal 1 consists of a guide slot strip 2 and a sealing strip 10. The guide slot strip 2 consists of three segments forming a continuous whole: a rear upward segment 4, a horizontal segment 5 and a front upward segment 6. The guide slot strip 2 is encased in the rear, upper and front posts forming the door frame (not depicted) in which the window slides. The guide slot strip 2 therefore has substantially a "U"-shaped profile. In FIG. 1, the window 70 is depicted half-way between its open position and its closed position. When the window 70 is in the closed position (high position), its upper edge comes into contact with the horizontal segment 5 of the guide slot strip, whilst its rear and front edges are respectively in contact over their entire length with the rear upward segment 4 and the front upward segment 6 of the guide slot strip. The rear upward segment 4 and the front upward segment 6 of the guide slot strip are linked by the sealing strip 10. The sealing strip is moulded, which makes it possible to give its front part 11 a shape exactly corresponding to the outer surface of the front upward segment 6 of the guide slot strip. A join line between the front part 11 of the sealing strip and the front upward segment 6 of the guide slot strip is therefore no longer necessary.

In its rear part, the sealing strip 10 bends in order to end with an upward part 12 substantially aligned with the rear upward segment 4 of the guide slot strip. The concave edge 13 of the sealing strip at the bend (rear lower corner of the door frame) has a curved shape.

The upper end of the upward part 12 of the sealing strip 10 is attached to the upward segment 4 of the guide slot strip 2 by a join line 41. In total, the junction between the guide slot strip 2 and the sealing strip 10 comprises a single join line 41. A join line between an extruded material such as the guide slot strip and a moulded material such as the sealing strip according to the invention has the appearance of a ridge. Through the presence of a single join line, the overall aesthetics and strength of the seal 1 according to the invention are therefore improved.

FIG. 2 is a cross-section of the seal 1 along the line II-II, in the region where the upward part 12 of the sealing strip is superposed on the upward segment 4 of the guide slot strip. It should be noted that the upward part 12 of the sealing strip is arranged so as to form a "U" in which the window 70 is intended to slide during its movement between its open position and its closed position. Over the portion where it is superposed on the upward segment 4 of the guide slot strip, the upward part 12 of the sealing strip is therefore substituted for a piece of the upward segment 4 of the guide slot strip which has been removed.

FIG. 3 is a cross-section of the seal 1 along the line III-III, in the region where the upward part 12 of the sealing strip is not in contact with the upward segment 4 of the guide slot strip. The upward segment 4 of the guide slot strip then forms the whole of the "U"-shaped groove in which the window 70 is intended to slide during its movement between its open position and its closed position. In the embodiment described above, the removal of a piece of the upward segment 4 of the guide slot strip for which the upward part 12 of the sealing strip is substituted allows optimum encasing of the seal 1 in the door frame.

FIG. 4 is a perspective view of the sealing strip 10. The sealing strip 10 is produced in a single piece, for example by moulding. In the case of manufacture by moulding, two polymers are bi-injected into the mould in order to obtain in the end a sealing strip comprising a rigid part 14 and a flexible part 16. The rigid part 14 is for example made of rigid plastic and the flexible part made of flexible elastomer. The rigid part 14 forms the convex edge of the sealing strip 10, whilst the flexible part 16 forms the concave edge of the sealing strip 10. The sealing strip 10 is intended to be fixed to the door frame by the rigid part 14 of the sealing strip.

The rigid part 14 of the sealing strip 10 comprises, on its vertical edge, means 28 of attaching to the rear upward post (not depicted) of the frame (FIGS. 1, 4 and 5).

FIG. 5 is another perspective view of the sealing strip, showing the profile intended to be flocked, and fixed to the rigid part 14 of the sealing strip 10. In FIG. 5, the profile is depicted as having the shape of a lip 20. This shape of the profile 20 makes it possible to provide better friction between the hairs of the flocking which will be fixed to the profile 20, and the window 70, in order to prevent water or other elements entering between the window and the door frame.

FIG. 6 shows the assembly of the sealing strip 10 and the flocked profile 20 in cross-section. The upper portion of the flexible part 16 covers the upper edge of the rigid part 14. The flocked profile 20 is fixed to a vertical portion of the rigid part 14 of the sealing strip 10, on the opposite side from the edge 30 of the door frame. The rigid part 14 of the sealing strip 10 is in its turn fixed to the edge 30 of the door frame. A lower portion of the flexible part 16 extends downwards so that the edge 30 of the frame to which the rigid part 14 is intended to be fixed is situated between the lower portion of the rigid part 14 and this lower portion of the flexible part 16.

The sealing strip 10 depicted in FIGS. 1 to 6 is depicted solely by way of a non-limiting example. The sealing strip 10 could have a different shape, within the limits of the scope of the present invention. For example, the concave edge 13 of the sealing strip 10 could form an angle instead of being curved.

Furthermore, the sealing strip 10 has been depicted in some figures provided with a flocked profile 20. It could alternatively be provided with another slippery coating intended to fulfil the same functions as a flocked profile.

The invention claimed is:

1. Window seal to be encased in a frame, configured to be in contact with part of the perimeter of a window, and comprising an extruded guide slot strip including two upward segments and an upper segment, and a sealing strip extending between a low part of one of said upward segments and a high part of the other of said upward segments, wherein said sealing strip comprises an upward curved part and a substantially horizontal extending part, and in that said sealing strip is attached at least at its upper end to one of said upward segments of the guide slot strip;

wherein the upward curved part and the substantially horizontal extending part are bi-injected into a mold and form the sealing strip as a single piece without a distinct transition between the upward curved part and the substantially horizontal extending part, while also defining in said sealing strip at least a rigid part and a flexible part which are distinct.

2. Seal according to claim 1, wherein said rigid part comprises means for holding on said frame.

3. Seal according to claim 2, wherein an upper portion of said flexible part covers the upper edge of said rigid part.

4. Seal according to claim 3, wherein a lower portion of said flexible part extends downwards so that the edge of said frame to which said rigid part is intended to be fixed is situated between a lower portion of said rigid part and said lower portion of said flexible part.

5. Seal according to claim 3, wherein said rigid part is made from rigid plastic and said flexible part is made from elastomer or thermoplastic.

6. Seal according to claim 3, wherein the junction between said sealing strip and one of said upward segments of the guide slot strip is situated close to said upper segment of the guide slot strip.

7. Seal according to claim 2, wherein a lower portion of said flexible part extends downwards so that the edge of said frame to which said rigid part is intended to be fixed is situated between a lower portion of said rigid part and said lower portion of said flexible part.

8. Seal according to claim 7, wherein said rigid part is made from rigid plastic and said flexible part is made from elastomer or thermoplastic.

9. Seal according to claim 2, wherein said rigid part is made from rigid plastic and said flexible part is made from elastomer or thermoplastic.

10. Seal according to claim 2, wherein the junction between said sealing strip and one of said upward segments of the guide slot strip is situated close to said upper segment of the guide slot strip.

11. Seal according to claim 1, wherein said rigid part is made from rigid plastic and said flexible part is made from elastomer or thermoplastic.

12. Seal according to claim 1, wherein the junction between said sealing strip and one of said upward segments of the guide slot strip is situated close to said upper segment of the guide slot strip.

13. Seal according to claim 1, at least part of the length of said sealing strip is provided with a slippery coating.

14. Seal according to claim 13, wherein said slippery coating is a flocked profile.

15. Seal according to claim 13, wherein said slippery coating is added on to said sealing strip.

16. Seal according to claim 13, wherein said slippery coating is fixed to said sealing strip.

17. Seal according to claim 13, wherein said slippery coating is located on a lip.

18. Seal according to claim 1, wherein the junction between said sealing strip and one of said upward segments of the guide slot strip is situated close to said upper segment of the guide slot strip.

19. Seal according to claim 1, wherein the sealing strip is a single component.

20. Seal according to claim 1, wherein the sealing strip is an integrally formed combination of a rigid portion along a length of the sealing strip and a flexible portion along a length of the sealing strip.

21. Seal according to claim 1, wherein the sealing strip is a single component defined by an integral combination of a rigid portion and a flexible portion, the rigid and flexible portion extending along the entire length of the sealing strip.

22. Seal according to claim 1, wherein the flexible part and the rigid part are integrally formed and integrally connected.

\* \* \* \* \*

UNITED STATES PATENT AND TRADEMARK OFFICE
CERTIFICATE OF CORRECTION

PATENT NO. : 8,429,855 B2  Page 1 of 1
APPLICATION NO. : 12/300825
DATED : April 30, 2013
INVENTOR(S) : Didier Stefanelli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this

Eighth Day of September, 2015

Michelle K. Lee
*Director of the United States Patent and Trademark Office*